Figure 1:
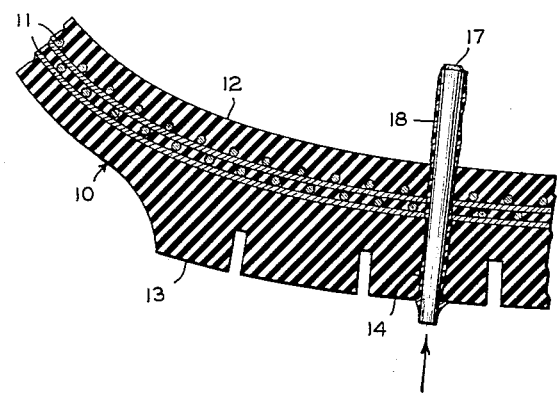

May 22, 1962  T. W. MULLEN, JR  3,035,625
TUBELESS TIRE REPAIR EQUIPMENT
Filed April 21, 1960

INVENTOR
T. W. MULLEN, JR

BY *A. Yates Dowell*
ATTORNEY

United States Patent Office 3,035,625
Patented May 22, 1962

3,035,625
TUBELESS TIRE REPAIR EQUIPMENT
Thomas W. Mullen, Jr., 2013 W. Iowa St.,
Evansville 2, Ind.
Filed Apr. 21, 1960, Ser. No. 23,788
1 Claim. (Cl. 152—370)

This invention relates to the repair of punctures in casings containing air under pressure and which casings are designed to rotate and forcibly to engage hard objects, some of which are of such character that the casings are ruptured or punctured so that the air escapes.

The invention relates to the repair of pneumatic tires such as, but not limited to, those used on automobiles and which may or may not be tubeless, and particularly to the provision of means for closing and sealing a puncture hole and preventing the escape of air therethrough.

Repair of relatively thick pneumatic tires including tires of bicycles, automobiles and other vehicles have been accomplished by vulcanization, by the application of patches, the insertion of fillers both rigid and flexible, and the like. The advent of the tubeless tire although similar to bicycles and automobile tires of an earlier era has presented additional problems. These problems include the necessity for quick and easy application of the repair material and either from the interior or exterior of the casing. Also it is necessary that the repair material remain in place and not be dislodged during use, that it remain plastic or elastic, that it include a hardening inhibited air sealant over the exterior so that it will flow under the influence of centrifugal force as well as air pressure and provide an adequate seal against the passage of air. In the solution of this problem plugs of rubber and other materials have been used but these have not provided successful repairs for tubeless tires since there is a tendency for the plug or rod of small diameter to move endwise within the puncture hole and at times become pinched or reduced in diameter by the compressive force of the casing in which the hole is located. Plugs inserted in puncture holes have been found to seal for a short time but to fail after limited use.

It is an object of the invention to provide a repair for a casing which repair includes a plug or filler piece in the form of a relatively solid elongated body having a coating of a tacky viscous substance which will provide an accumulation or extra supply which can pass into the puncture hole around the filler piece as a result of air pressure and centrifugal force in a manner to fill the hole including the irregular portions and cavities normally appearing in the wall in which the plug or filler piece is located and which ordinarily would not have sufficient flowability completely to enter the several depressions and cavities.

Another object of the invention is to provide a repair plug or filler slightly tapered and provided on the inwardly projecting free end of the same within the casing with a coating of hardening inhibited air sealant of a character to provide an accumulation or reservoir of air sealant around the filler piece where it can flow under the action of air pressure and centrifugal force into the puncture opening and due to its retention of its capacity to flow over a relatively long period it will work into the casing under the pumping action produced as the casing is rotated, the air pressure and centrifugal force causing the air sealant to work along the length of the plug or filler inside the puncture hole and to fill the minute cavities and holes along the length of the puncture hole to provide an effective air seal.

A further object of the invention is to provide a simple and inexpensive repair or filler which can be applied interiorly or exteriorly of the casing and in a minimum of time and with a minimum of effort and which will effectively prevent the passage of air.

Figure 2:
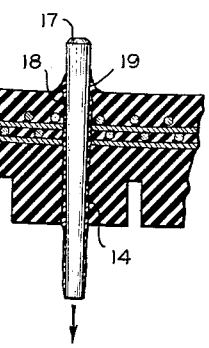
Figure 3:
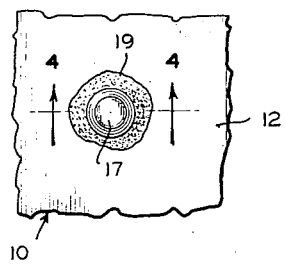
Figure 4:
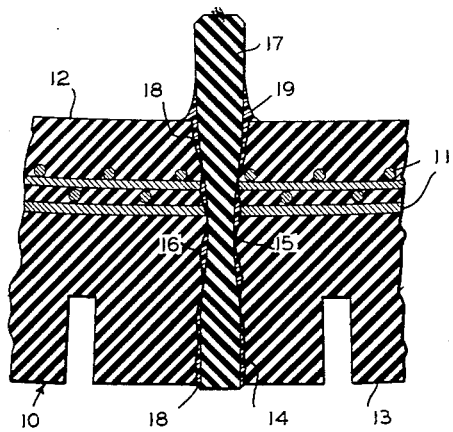

Other objects and advantages of the invention will be apparent from the following description taken in conjunction with the accompanying drawing wherein:

FIG. 1 is a fragmentary transverse section through a casing or tire illustrating a plug introduced but ready to be seated;

FIG. 2, a similar view with the plug seated and with an accumulation of the coating about the inner end of the same;

FIG. 3, an enlarged fragmentary top plan view of FIG. 2;

FIG. 4, a section on the line 4—4 of FIG. 3; and

Figure 5:
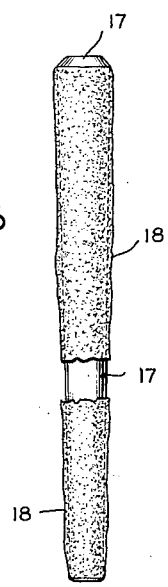

FIG. 5, a side elevation of the plug or filler with part of its coating broken away.

Briefly stated, the invention is a coated filler for a puncture hole of a reinforced elastic casing or tire, the coating of such filler including a hardening inhibited air sealant which when the filler is inserted in the puncture hole of the casing will provide an accumulation of the sealant adjacent the puncture hole and which accumulation of sealant will flow into the puncture hole by air pressure and centrifugal force and seal the same.

With continued reference to the drawing, a casing 10 is provided with the usual reinforcing cords 11 nearest to its inner wall 12. The opposite wall 13 forms the tread or wear-receiving portion of the casing. The casing such as the present day tubeless tire is illustrated as having received a puncture hole 14 caused by any well known puncture producing means (not shown) and such puncture hole will have an irregular roughened wall due to the fact that the puncture producing means actually tore the rubber rather than cut or punched the same with the result that there are projections 15 and depressions or cavities 16. It is virtually impossible to seal the puncture hole by a simple plug as the periphery of the same will not intimately contact the surface of the hole along the entire length of the latter in and around the projections 15 and the cavities or depressions 16. This is true where the plug is made in the usual well known manner from natural or synthetic rubber so it will have compatible resiliency required for use in conjunction with the substance of the casing.

It is desirable to have a lug of filler 17 of rubber, metal or other material of sufficient body and stability or stiffness that it may be readily inserted in the puncture hole either from the exterior or from the interior and with such body straight or tapered as preferred. Upon the body is applied a relatively heavy viscous coating 18 of hardening resistant material for providing a seal between such body and the wall in which the puncture is located. The solid plug or filler may be of a substance which is compressible in order that the plug or filler may be compressed or squeezed along its mid-portion to give it when applied as illustrated in FIG. 4 a more or less hour-glass configuration enhancing its retention in the puncture hole to which it is applied. If preferred, the plug or filler may be of other material of similar or greater hardness including metal, in which event there will be no compression of the same. Also if desired the plug or filler may have a roughened surface to improve the intimacy of the coating therewith.

The relatively heavy viscous coating 18 is of a character that it will remain tacky, adhesive and readily flowable under conditions of use including while subjected to air pressure within the casing and centrifugal force and will migrate along the periphery of the filler within the puncture hole and gradually will work into the numerous depressions and cavities 16 and around the projections 15 in the wall of the puncture hole. Due to centrifugal force and the tendency of the air within the casing to escape between the plug or filler and the wall of the puncture hole and further due to the kneading or pumping action of the casing over a long period, the relatively heavy coating will flow or migrates sufficiently to provide a complete seal, it being necessary to employ a coating of hardening inhibited substance which due to its flowability will be distributed over the entire joint between the plug or filler and the wall of the puncture hole. On account of the fact that the coating is inhibited from hardening, it will produce adhesion between the filler and the wall of the hole to provide a complete seal. The character of the coating on the plug or filler member is such that there will be an accumulation of excess coating substance about the plug or filler within the interior of the tire or casing and this accumulation is such that in effect it will provide an abutment or head 19 about or along the inner end of the plug or filler 17.

The filler 17 may be inserted in either end of the puncture hole or applied from the exterior or interior of the tire or casing and when it is applied it should be left with the end on the inner side of the tire or casing of sufficient length to provide ample excess flowable sealant which during the use of the tire or casing can flow or migrate by air pressure and centrifugal force into the joint along the filler as previously described. When the application of the plug or filler is from the exterior, if the plug or filler is slightly tapered the large end should be inserted and the device driven from the smaller end to force the larger end through the tire or casing and then withdrawn slightly to form the abutment or head.

The air sealant may comprise, but is not limited to, a mixture of ingredients as exemplified by the following: rubber, pine rosin or synthetic resin or resins of a plastic character generally used in adhesives including polyester, urea formaldehyde or the like, and a hardening inhibiting or rubber solvent substance such as petroleum, castor, linseed, or other suitable oils used individually or in combination to have the proper hardening inhibiting character. The primary characteristics being that the air sealant coating be tacky, adhesive, and flowable over a sufficient length of time so that it will migrate along the joint between the filler and the wall of the puncture hole and provide an air seal. The principal ingredient of course will need be rubber or a rubbery substance with material of lesser importance in the form of pine rosin or synthetic resins but with only enough oil or hardening inhibiting agent to retain the resiliency and sealing characteristics necessary and if desired with a small amount of coloring ingredient such as iron oxide or lamp black.

It has been found that approximately two-thirds or 60% rubber, 25-35% rosin or resin, 5-10% of oil or hardening inhibiting agent, and 1-5% iron oxide or lamp black provide a highly effective coating.

The filler should be of appropriate length preferably being made substantially longer than the length of the puncture hole and after it is applied its inner end should project between one-quarter and one-half inch within the tire or casing and it should be cut off substantially flush with the tread of the tire and being inexpensive the portion cut off may be discarded. As indicated the air sealant will fill the cavities and holes between the filler member and the wall of the puncture hole in the casing throughout substantially the entire length of the filler member due to the feeding in from the accumulation of the coating, it being necessary that the air sealant feed into the joint to provide intimate cohesion between the respective members.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

A repair device for a puncture hole bounded by an irregular shaped wall in a tubeless pneumatic tire having an inherently resilient carcass of rubber and substantially non-stretchable reinforcing cords incorporated therein, said tire repair device comprising a rubbery elongated solid resilient plug tapered to form larger and smaller end portions and of a stiffness to be inserted from the exterior the larger end first in a puncture hole of a tire without the aid of a tool and in a manner to be gripped by the material of the tire defining the puncture hole, an air sealant of a heavy viscous coating of rubber adhesive having incorporated therein a hardening inhibiting agent, said air sealant extending over the length of said plug and of a character that when the filler is inserted in the puncture hole of the tire the larger end will project into the interior of the tire sufficient to hold an accumulation of the air sealant, and the plug will be squeezed between its extremities in a manner to cause it to conform to the contour of the wall of the puncture hole and an accumulation of the air sealant will be caused to form about the plug on the interior of the tire and provide an obstruction against the leakage from a tire, said air sealant being of a consistency to remain sufficiently tacky that when pressure within the tire and centrifugal force during rotation of the tire will cause enough of the air sealant to flow lengthwise of the plug in a puncture hole to fill completely the space between the wall of the puncture hole and the plug and seal against air passage.

References Cited in the file of this patent
UNITED STATES PATENTS

| | | |
|---|---|---|
| 746,207 | Vosburgh | Dec. 8, 1903 |
| 2,803,284 | Mullen | Aug. 20, 1957 |